United States Patent
Kim (10) Patent No.: US 12,512,349 B2
(45) Date of Patent: Dec. 30, 2025

(54) WAFER YIELD ANALYSIS METHOD AND APPARATUS BASED ON WAFER MAP

(71) Applicant: SK hynix Inc., Icheon-si (KR)

(72) Inventor: Taebeom Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 439 days.

(21) Appl. No.: 18/323,780

(22) Filed: May 25, 2023

(65) Prior Publication Data

US 2024/0234188 A1  Jul. 11, 2024

(30) Foreign Application Priority Data

Jan. 5, 2023 (KR) .................. 10-2023-0001489

(51) Int. Cl.
*H01L 21/67* (2006.01)
*G06T 7/00* (2017.01)
*G06T 11/20* (2006.01)

(52) U.S. Cl.
CPC ...... *H01L 21/67288* (2013.01); *G06T 7/0004* (2013.01); *G06T 11/206* (2013.01); *G06T 2207/30148* (2013.01)

(58) Field of Classification Search
CPC ......... G06T 2207/30148; G06T 7/0004; G06T 11/206; H01L 22/20; H01L 21/67276; H01L 21/67288; H01L 22/12
See application file for complete search history.

(56) References Cited

U.S. PATENT DOCUMENTS

2006/0128039 A1    6/2006   Lin
2017/0356955 A1*  12/2017   Sumikawa ......... G01R 31/2894

FOREIGN PATENT DOCUMENTS

JP          4925200 B2  *  4/2012
KR    10-2019-0081709 A      7/2019

* cited by examiner

*Primary Examiner* — Matthew C Bella
*Assistant Examiner* — Janice E. Vaz (57) ABSTRACT

An operation method of a wafer analysis device include: generating a wafer map that is an image visualizing and showing whether each of a plurality of chips included in a wafer is normal or defective; applying virtual normal chips to the wafer map such that the number of chips adjacent to each of all the chips on an outermost edge of the wafer map is eight; obtaining the number of normal chips among eight adjacent chips of each of defective chips among the plurality of chips; determining whether a failure of each of the defective chips is caused by a systematic failure or a random failure.

10 Claims, 6 Drawing Sheets

WAFER YIELD ANALYSIS METHOD AND APPARATUS BASED ON WAFER MAP

CROSS-REFERENCE TO RELATED APPLICATIONS

The present application claims priority under 35 U.S.C. § 119 to Korean Patent Application No. 10-2023-0001489, filed Jan. 5, 2023 in the Korean Intellectual Property Office, which is incorporated herein in its entirety for all purposes by this reference.

BACKGROUND

Field

Embodiments of the present disclosure relate to a wafer yield analysis method and an apparatus based on a wafer map.

Description of the Related Art

Many semiconductor chips that perform the same function may be formed on one semiconductor wafer after various manufacturing processes are performed.

In a wafer on which many semiconductor chips are formed, whether a failure occurs in each of the semiconductor chips can be determined through various electrical tests. Also, a wafer map can be generated as an image visualizing and showing whether each semiconductor chip is defective or normal.

A failure of a semiconductor chip may be identified as a random failure and a systematic failure. A random failure may refer to a failure that occurs randomly due to processing problems from foreign substances or scratches, etc., which are unexpectedly generated during the manufacturing process. A systematic failure may refer to a failure caused by non-standard processes and equipment or by implants, etc. A systematic failure may mean that the failure is not randomly distributed on the wafer and failures may form a cluster at a particular position of the wafer.

In order to improve wafer yield, it is necessary to reduce failures in the semiconductor chips. In general, for systematic failures, yield can more quickly improve than in the case of random failures. While systematic failures can be quickly reduced by identifying a clear root cause of the failures and then improving the process, it is difficult to identify the causes of random failures, so a greater amount of time and effort may be required to identify the root causes and to improve the processes.

Accordingly, yield can improve more quickly only when the failures of the wafer are identified as random failures or systematic failures and when root causes are identified and improvement measures can be made in parallel.

In the past, random failures have been identified by the number of failures according to the area of the wafer using models such as a Poisson model or a Bose-Einstein model. However, this results in a low yield accuracy, so that it is difficult to identify and analyze the failures.

On the other hand, a linear regression equation obtained by modifying the Poisson model is used to identify systematic failures. However, this method has limitations in the yield analysis at the edge of the wafer.

SUMMARY

The present disclosure is related to a method for identifying random failures and systematic failures on the basis of positions of a defective chip and a normal chip, which are visualized on the wafer map.

The present disclosure is related to a method for enhancing the accuracy of identifying failures in chips formed at a wafer edge.

The technical problem to be overcome in the present disclosure is not limited to the above-mentioned technical problems. Other technical problems not mentioned can be clearly understood from embodiments of the present disclosure by a person having ordinary skill in the art.

One embodiment of the present disclosure is a method of operating a wafer analysis device, which may include: generating a wafer map with an image showing whether each of a plurality of chips included in a wafer is normal or defective; applying virtual normal chips to the wafer map such that a total number of chips adjacent to each of the plurality of chips at an outermost edge of the wafer map is eight; obtaining, for each defective chip among the plurality of chips, the number of normal chips among eight adjacent chips; and determining that a failure of a defective chip is caused by a systematic failure when the number of adjacent normal chips for the defective chip is less than or equal to a predetermined number (e.g., six); and determining that a failure of a defective chip is caused by a random failure when the number of adjacent normal chips is greater than the predetermined number.

Another embodiment of the present disclosure is a method of operating a wafer analysis device, which may include: generating a wafer map with an image showing whether each of a plurality of chips included in a wafer is normal or defective; obtaining, for each defective chip among the plurality of chips, the number of defective chips among eight adjacent chips; and determining that a failure of a defective chips is caused by a systematic failure when the number of adjacent defective chips for the defective chip is greater than or equal to a predetermined number (e.g., two); and determining that a failure of a defective chip is caused by a random failure when the number of adjacent defective chips is less than the predetermined number.

Another embodiment of the present disclosure is a wafer analysis device which may include: a memory that stores wafer map information including an image visualizing and showing whether each of a plurality of chips included in a wafer is normal or defective; and a processor that applies virtual normal chips to the wafer map such that the number of chips adjacent to each of the chips on at outermost edge of the wafer map is eight, that obtains the number of normal chips among eight chips adjacent to each defective chip among the plurality of chips, that determines that the failure of a defective chip is caused by a systematic failure if the obtained number of normal chips is less than or equal to a predetermined number (e.g., six), and that determines that the failure of a defective chip is caused by a random failure if the obtained number of normal chips is greater than the predetermined number.

Another embodiment of the present disclosure is a wafer analysis device which may include: a memory that stores wafer map information that is an image visualizing and showing whether each of a plurality of chips included in a wafer is normal or defective; and a processor that obtains the number of defective chips among eight adjacent chips of each of defective chips among the plurality of chips, determines that the failure of a defective chip is caused by a systematic failure when the obtained number of defective chips is greater than or equal to a predetermined number (e.g., two), and determines that the failure of a defective chip is caused by a random failure when the obtained number of defective chips is less than the predetermined number.

DETAILED DESCRIPTION

Hereinafter, embodiments of the present disclosure will be described in detail with reference to the accompanying drawings.

Figure 1:
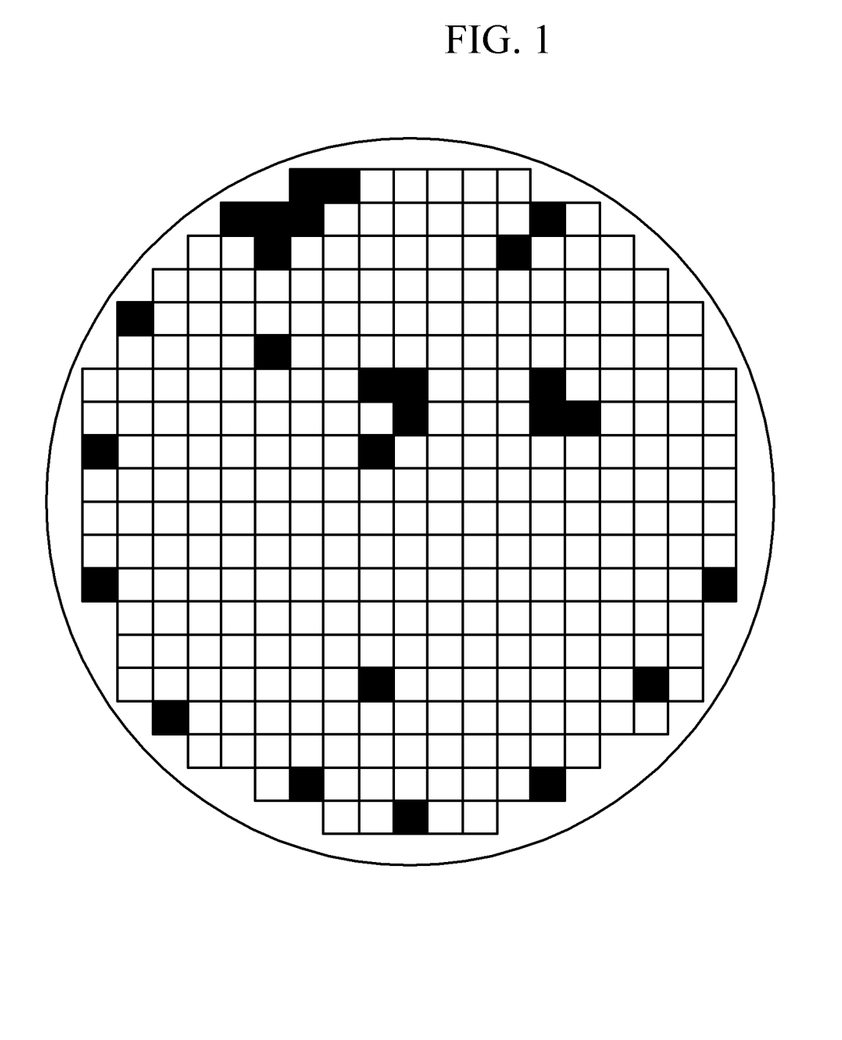
FIG. 1 shows a wafer map according to an embodiment of the present disclosure.

FIG. 1 shows a wafer map according to an embodiment of the present disclosure.

Referring to FIG. 1, a plurality of semiconductor chips is formed on a wafer. By performing electrical tests on the plurality of semiconductor chips, each semiconductor chip can be tested to determine whether the chip is defective or normal. From these tests, a wafer map can be generated that indicates, in an image, which of the semiconductor chips is defective based on the determined results. In the embodiment in FIG. 1, each square represents one semiconductor chip. A defective semiconductor chip may be represented by a black square, and a normal semiconductor chip may be represented by a white square.

Figure 2A:
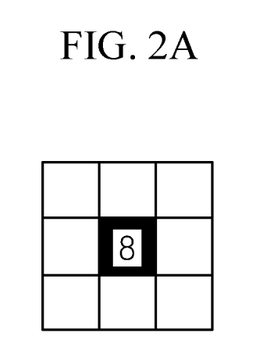
FIGS. 2A, 2B and 2C illustrate a method for identifying a failure according to embodiments of the present disclosure.
Figure 2B:
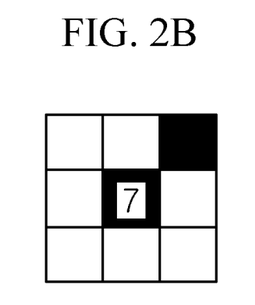
Figure 2C:
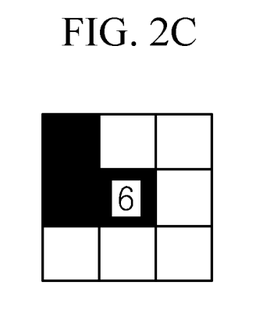

FIGS. 2A, 2B, and 2C illustrate a method for identifying failure according to embodiments of the present disclosure.

Referring to FIGS. 2A, 2B, and 2C, as shown in FIG. 2A, in order to determine whether the failure of the chip is a random failure or a systematic failure, the number of normal chips among eight chips surrounding the defective chip in the center may be obtained. For example, in the example shown in FIG. 2A, the number of normal chips among eight adjacent chips is eight. In the example shown in FIG. 2B, the number of normal chips is seven, and in the example shown in FIG. 2C, the number of normal chips is six. When the number of normal chips among eight adjacent chips is greater than or equal to seven, as shown in FIG. 2A and FIG. 2B, the failure of the defective chip in the center may be determined as a random failure. When the number of normal chips among eight adjacent chips is less than seven, as shown in FIG. 2C, the failure of the chip may be determined as a systematic failure.

In FIGS. 2A-2C and the following figures, an example will be described in which the number of normal chips around a defective chip in the center is obtained, as described above. At the same time, the number of defective chips around the defective chip in the center may also be obtained. For example, in FIG. 2A, the number of defective chips among eight adjacent chips is zero. In FIG. 2B, the number of defective chips is one, and in FIG. 2C, the number of defective chips is two. Also, as illustrated in FIG. 2A or FIG. 2B, if the number of defective chips among eight adjacent chips is less than or equal to one, then the failure of the defective chip in the center may be determined as a random failure, and as shown in FIG. 2C, if the number of defective chips among eight adjacent chips is greater than one, then the failure of the defective chip in the center may be determined as a systematic failure.

As shown in FIGS. 2A, 2B, and 2C, when determining whether a failure of the defective chip is a random failure or a systematic failure by using adjacent chips, there may not, as shown in FIG. 1, eight adjacent chips around a chip formed at an edge of the wafer. Thus, errors may occur in the determination of whether a defective chip at an edge of the wafer is the result of a random failure or a systematic failure. In order to solve the above-mentioned problem, and to clearly identify the type of failure of a chip at an edge of the wafer, a virtual normal chip may be added to an outer periphery of the wafer.

Figure 3:
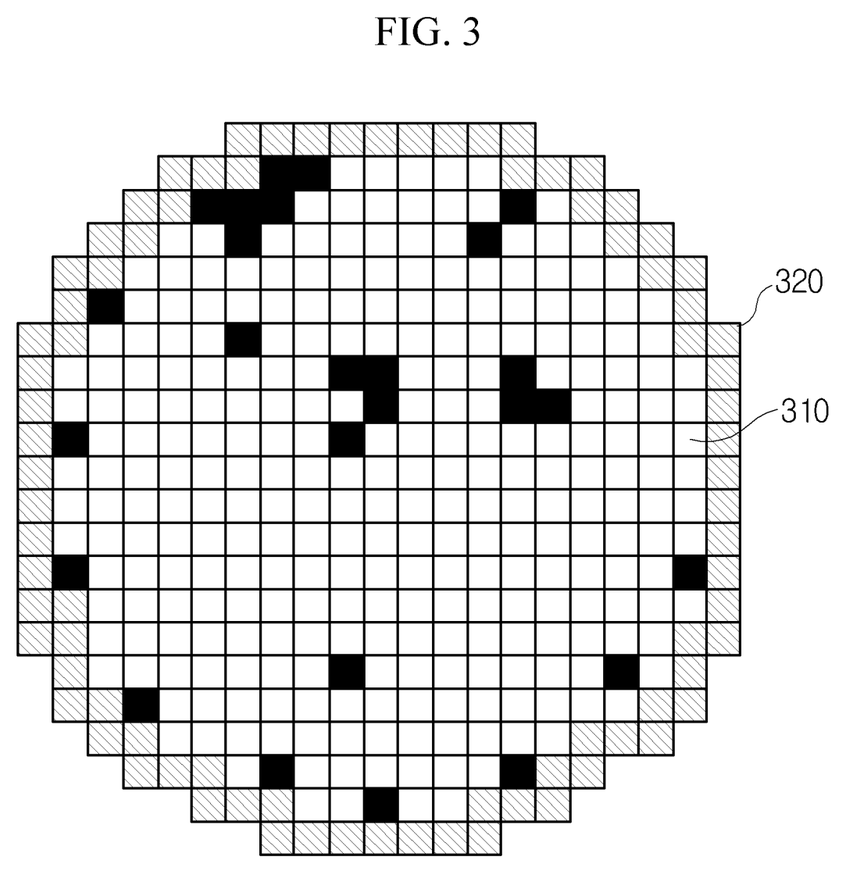
FIG. 3 illustrates a wafer map to which a virtual normal chip is added at an outer periphery in accordance with embodiments of the present disclosure.

FIG. 3 illustrates a wafer map to which a virtual normal chip is added at an outer periphery in accordance with embodiments of the present disclosure.

Referring to FIG. 3, in order to ensure that eight chips surround around outermost chips 310 on the wafer map for the purpose of determining the cause of chip failures, virtual normal chips 320 are added to the outer periphery of the outermost chips 310 on the wafer map. By adding the virtual normal chips 320 to the outer periphery of the wafer map, the number of chips that surround each of the outermost chips 310 on the wafer map can be set to eight, and it can be determined whether each of the eight adjacent chips is normal or defective in order to determine whether a failure of the defective chip among outermost chips 310 is a random failure or a systematic failure.

Figure 4:
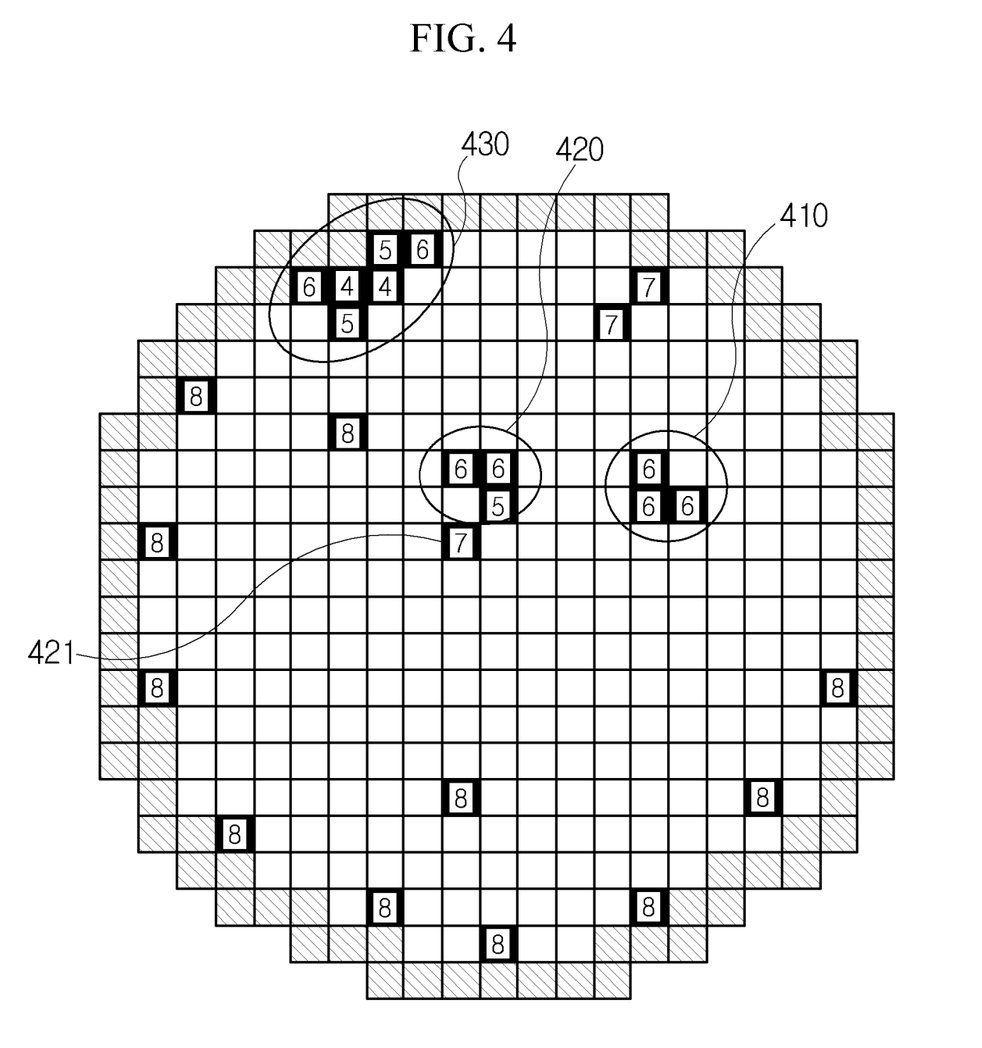
FIG. 4 illustrates a wafer map with results of obtaining the number of normal chips around each defective chip in accordance with embodiments of the present disclosure.

FIG. 4 illustrates a wafer map with results of obtaining the number of normal chips around each defective chip in accordance with embodiments of the present disclosure.

Referring to FIG. 4, each defective chip is illustrated with a number. The number indicated on each defective chip may be the number of normal chips among eight chips adjacent to the defective chip. In addition, according to the method illustrated in FIGS. 2A to 2C, when analyzing for random failures and systematic failures, the failures of the defective chips within ellipses 410, 420, and 430 may be determined to be caused by systematic failures (i.e., number of normal chips among eight adjacent chips is less than seven), and the failure of the other defective chips may be determined to be caused by random failures (i.e., number of normal chips among eight adjacent chips is seven or greater).

Figure 5:
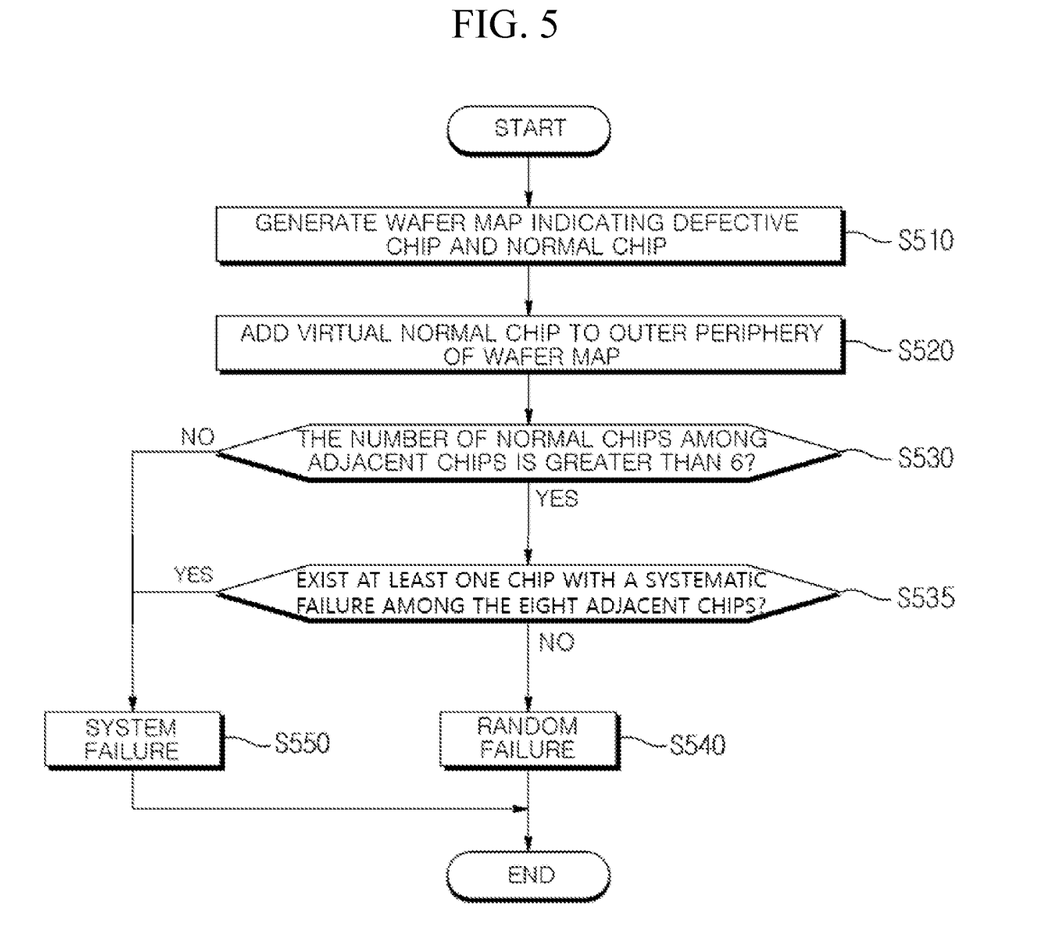
FIG. 5 is a flowchart illustrating a method for determining whether a failure of a chip is a random failure or a systematic failure in accordance with embodiments of the present disclosure.

FIG. 5 is a flowchart illustrating a method for determining whether a failure of a chip is a random failure or a systematic failure in accordance with embodiments of the present disclosure.

Referring to FIG. 5, in step S510, an analysis device may generate a wafer map indicating defective chips and normal chips. The wafer map is an image that indicates each semiconductor chip formed on the wafer and may, as shown in FIG. 1, distinguish defective chips from normal chips. According to an embodiment, defective chips may be represented by black squares and normal chips may be represented by white squares. Alternatively, for example, defective chips may be represented by the number 0 and normal chips may be represented by the number 1.

In step S520, the analysis device may add virtual normal chips to the outer periphery of the wafer map.

In step S530, for each defective chip, the analysis device may obtain the number of normal chips from among eight adjacent chips and may determine whether the number of normal chips is greater than, less than or equal to a predetermined value (e.g., 6).

As a result of the determination in step S530, if the number of normal chips among eight adjacent chips is greater than the predetermined value, then the analysis device may determine that the failure of the chip corresponds to a random failure in step S540.

As a result of the determination in step S530, if the number of normal chips among eight adjacent chips is less than or equal to the predetermined value, then the analysis device may determine that the failure of the chip corresponds to a systematic failure in step S550.

According to the above-described method in connection with FIG. 4, failures of the defective semiconductor chips within an area indicated by ellipses 410, 420, and 430 may be determined as the systematic failures because the number of normal chips among eight adjacent chips is less than or equal to a predetermined value (e.g., 6) for each defective chip.

In the example of FIG. 4, a defective chip 421 right next to a defective chip in an area indicated by the ellipse 420 is determined to have a random failure because the number of normal chips is greater than a predetermined value. However, since the defective chip 421 is adjacent to the chips with systematic failures, the failure of the defective chip 421 may also be caused by a systematic failure. By changing the failure category of defective chip 421 from random failure to systematic failure, performance may be improved. Therefore, after step S530, an additional logic or criteria (S535) may be optionally added for determining whether a chip with a random failure in the above scenario is a chip with a systematic failure. That is, before a final determination of random failure for any defective chip, when at least one chip with a systematic failure exists among the eight chips adjacent to the defective chip, the defective chip may be identified as a defective chip with a systematic failure instead of a random failure.

According to another embodiment, in step S530, the analysis device may obtain the number of defective chips from among chips adjacent to a target defective chip, and may determine whether the number of defective chips is less than, greater than, or equal to a predetermined value (e.g., 2). If the number of defective chips is less than the predetermined value, then the analysis device may determine that the failure of the chip is a random failure. If the number of defective chips is greater than or equal to the predetermined value, then the analysis device may determine that the failure of the chip is a systematic failure. In this case, the analysis device need not perform the step S520 of adding the virtual normal chip to the outer periphery of the wafer map. Instead, the analysis device may determine existence of semiconductor chip around the target defective chip and determine whether the existing semiconductor chip has defective.

As another modified example, in step S520, the analysis device may determine, for the eight positions surrounding a target defective chip, whether a semiconductor chip is present. If semiconductor chips are found in all eight locations, then the analysis device does not have to add a virtual normal chip to the outer periphery of the wafer map. If a semiconductor chip is not present at a corresponding position, however, the analysis device may perform an operation equivalent to the addition of the virtual normal chip to the outer periphery of the wafer map, thereby increasing the number of normal chips by one.

Figure 6:
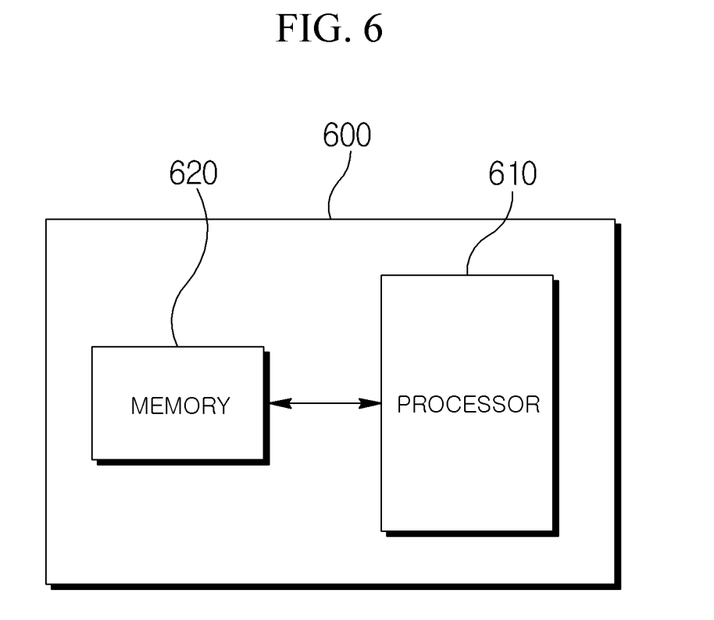
FIG. 6 illustrates a simple configuration of an analysis device according to embodiments of the present disclosure.

FIG. 6 illustrates a simple configuration of an analysis device according to embodiments of the present disclosure.

Referring to FIG. 6, an analysis device 600 that is used to identify chip failures and to analyze wafer yield may be a computing device including a processor 610 and a memory 620.

The analysis device 600 may receive test results from the outside and then may generate a wafer map. Also, the analysis device 600 may store the generated wafer map in the memory 620 or may receive a wafer map generated by an external device through an input/output device or a network, and may store the wafer map in the memory 620.

The analysis device 600 may perform the steps shown in FIG. 5 based on the wafer map stored in the memory 620 and may determine whether chip failures are random or systematic.

The analysis device 600 may determine whether the failure of each chip is a random failure or a systematic failure, and then may calculate a yield of a wafer based on the determination.

The following Table 1 shows a comparison of the yields obtained by a conventional method and a method proposed in the present disclosure.

TABLE 1

| | Actual wafer yield | Calculated random yield value | Calculated system yield value | Yield |
|---|---|---|---|---|
| Conventional calculation method | 90.5% | 95.3% | 94.7% | 90.3% |
| Method proposed in the present disclosure | 90.5% | 95.3% (93.4%~96.5%) | 94.9% | 90.5% |

In Table 1, a conventional formula calculation method uses a Bose-Einstein model for random yield calculation and uses a linear regression equation for system yield calculation. Also, the yield is obtained through multiplication of the random yield value and the system yield value. As a result of the comparison in Table 1, it can be seen that while the random yield is the same, the system yield value of the method proposed in the present disclosure is about 0.2% higher than that of the conventional formula calculation method, and thus, finally, the method proposed in the present disclosure obtains the same yield as the actual wafer yield.

The following table 2 shows a comparison of results obtained by analyzing a systematic failure improvement process test wafer by the conventional linear regression equation and by the method proposed in the present disclosure.

TABLE 2

| | Actual wafer yield | Calculated random yield value | Calculated system yield value |
|---|---|---|---|
| Conventional linear regression equation | 89.6% → 90.0% | 95.4% → 96.6% | 93.9% → 93.2% |
| Method proposed in the present disclosure | 89.6% → 90.0% | 94.9% → 95.4% | 94.7% → 94.7% |

Referring to Table 2, while the random yield is improved by the conventional linear regression equation analysis, the system yield is reduced, and thus, the consistency of the yield analysis is reduced. However, through use of the method proposed in the present disclosure, it can be appreciated that there are effects of not varying the system yield and of improving the random yield (of getting closer to the actual yield).

The following table 3 shows the results of comparing, based on the method proposed in the present disclosure, yields both when a random failure improvement process is added and when not added.

TABLE 3

|  | Actual wafer yield | Calculated random yield value | Calculated system yield value |
|---|---|---|---|
| Before applying the failure improvement process | 89.5% (86.7%~91.4%) | 94.9% (93.4%~96.3%) | 94.7% (92.8%~96.5%) |
| After applying the failure improvement process | 90.0% (89.1%~90.8%) | 95.4% (94.4%~96.4%) | 94.7% (93.8%~96.0%) |

Referring to Table 3, it can be found that the wafer actual yield increases by 0.5% due to the improvement in the failure determination process. Similarly, it can be found that the calculated random yield value determined based on the method proposed in the present disclosure also increases by 0.5%. On the other hand, it can be found that the calculated system yield value remains the same at 94.7%. That is, it can be appreciated that the method proposed in the present disclosure accurately reflects the actual yield.

The following Table 4 shows the results of comparing, based on the method proposed in the present disclosure, yields both when a system failure improvement process is added and when not added.

TABLE 4

|  | Actual wafer yield | Calculated random yield value | Calculated system yield value |
|---|---|---|---|
| Before applying the failure improvement process | 87.4% (86.1%~90.2%) | 96.2% (95.2%~97.0%) | 91.2% (89.4%~94.5%) |
| After applying the failure improvement process | 89.0% (88.3%~90.0%) | 95.9% (95.6%~96.1%) | 93.1% (92.2%~93.5%) |

Referring to Table 4, it can be found that the wafer actual yield increases by 1.6% due to the improvement in the failure determination process. Similarly, it can be found that the calculated system yield value determined based on the method proposed in the present disclosure also increases by 1.9%. On the other hand, it can be found that the variation in the calculated random yield value remains almost the same at 0.3%. That is, it can be appreciated that the method proposed in the present disclosure accurately reflects the actual yield.

As described above, the present disclosure proposes methods for easily identifying and determining chips with random failures and chips with systematic failures for each of the plurality of semiconductor chips formed on the wafer.

It can be understood that the yield calculated by the method proposed in the present disclosure is more consistent with the actual wafer yield than the conventional method. Therefore, the method for identifying random failures and systematic failures, which is proposed in the present disclosure and the yield calculation based on the method can show more clearly whether the failures are improved by the failure improvement process, thereby increasing the efficiency of improvement work.

According to various embodiments of the present disclosure, a method for identifying random failures and systematic failures on the wafer map is presented, so that it is possible to define whether the defective chip on the wafer map is caused by random failures and systematic failures.

Also, according to various embodiments of the present disclosure, a method for enhancing the accuracy in determining whether the failure of the chips formed at the edge of the wafer are random failures or systematic failures is presented, so that it is possible to identify the wafer edge failures.

Also, according to various embodiments of the present disclosure, the accuracy of identifying the failures is increased, so that clearer verification is possible in the yield analysis of the improvement process test wafer, and accordingly, as the yield analysis is quickly applied to the production, there is an effect of obtaining yield improvement.

What is claimed is:

1. A method of operating a wafer analysis device, the method comprising:
    generating a wafer map with an image showing whether each of a plurality of chips included in a wafer is normal or defective;
    applying virtual normal chips to the wafer map such that a total number of chips adjacent to each of the plurality of chips at an outermost edge of the wafer map is eight;
    obtaining, for each defective chip among the plurality of chips, the number of normal chips among eight adjacent chips; and
    determining that a failure of a defective chip is caused by a systematic failure when the number of adjacent normal chips for the defective chip is less than or equal to a predetermined number; and
    determining that a failure of a defective chip is caused by a random failure when the number of adjacent normal chips is greater than the predetermined number.

2. The operation method of claim 1, further comprising analyzing a yield of the wafer on the basis of a random failure or a systematic failure determined for each of the defective chips.

3. The operation method of claim 1, further comprising, when determined that a failure of a defective chip is caused by a random failure since the number of adjacent normal chips is greater than the predetermined number, determining that a failure of the defective chip is caused by a systematic failure when at least one of the eight chips adjacent to the defective chip is a defective chip caused by a systematic failure.

4. The operation method of claim 1, wherein the predetermined number is six.

5. An operation method of a wafer analysis device, the method comprising:
    generating a wafer map that is an image visualizing and showing whether each of a plurality of chips included in a wafer is normal or defective;
    obtaining the number of defective chips among eight chips adjacent to each defective chip from among the plurality of chips; and
    determining whether each of the defective chips is caused by a systematic failure or a random failure,
    wherein the determining whether each of the defective chips is caused by a systematic failure or a random failure comprises:
    determining that each of the defective chips is caused by a systematic failure if the obtained number of defective chips is greater than or equal to a predetermined number; and determining that each of the defective chips is caused by a random failure if the obtained number of defective chips is less than the predetermined number.

6. The operation method of claim 5, comprising analyzing a yield of the wafer on the basis of the random failure or the systematic failure determined for each of the defective chips.

7. The operation method of claim 5, wherein the determining whether each of the defective chips is caused by a systematic failure or a random failure further comprises determining, when a defective chip caused by a systematic failure is included in the eight chips adjacent to the defective chip, the failure of the defective chip is caused by a systematic failure.

8. The operation method of claim 5, wherein the predetermined number is two.

9. A wafer analysis device comprising:
a memory that stores wafer map information including an image visualizing and showing whether each of a plurality of chips included in a wafer is normal or defective; and
a processor that applies virtual normal chips to the wafer map such that the number of chips adjacent to each of the chips at an outermost edge of the wafer map is eight, that obtains the number of normal chips among eight chips adjacent to each defective chip among the plurality of chips, that determines that the failure of a defective chip is caused by a systematic failure if the obtained number of normal chips is less than or equal to a predetermined number, and that determines that the failure of a defective chip is caused by a random failure if the obtained number of normal chips is greater than the predetermined number.

10. A wafer analysis device comprising:
a memory that stores wafer map information that is an image visualizing and showing whether each of a plurality of chips included in a wafer is normal or defective; and
a processor that obtains the number of defective chips among eight adjacent chips of each of defective chips among the plurality of chips, determines that the failure of a defective chip is caused by a systematic failure when the obtained number of defective chips is greater than or equal to a predetermined number, and determines that the failure of a defective chip is caused by a random failure when the obtained number of defective chips is less than the predetermined number.

* * * * *